United States Patent [19]
York, Jr.

[11] 3,853,519
[45] Dec. 10, 1974

[54] GAS FILTER

[75] Inventor: Jimmie D. York, Jr., Louisville, Ky.

[73] Assignee: American Air Filter Company Inc., Louisville, Ky.

[22] Filed: Oct. 3, 1972

[21] Appl. No.: 294,552

[52] U.S. Cl............ 55/387, 55/513, 55/518, 55/525, 55/DIG. 31
[51] Int. Cl............................................ B01d 39/02
[58] Field of Search ............ 55/387, 491, 492, 503, 55/512, 515, 518, 525, DIG. 31, 433, 490, 494, 513, 516, 484

[56] References Cited
UNITED STATES PATENTS

| | | | |
|---|---|---|---|
| 2,989,145 | 6/1961 | Goodloe | 55/443 |
| 3,186,149 | 6/1965 | Avers | 55/387 |
| 3,330,101 | 7/1967 | Murphy, Jr. | 55/518 |
| 3,350,860 | 11/1967 | Grassel et al. | 55/387 |
| 3,410,055 | 11/1968 | Zenz | 55/387 |
| 3,581,476 | 6/1971 | Rivers | 55/387 |
| 3,747,772 | 7/1973 | Brown | 55/DIG. 31 |

Primary Examiner—Frank W. Lutter
Assistant Examiner—David L. Lacey

[57] ABSTRACT

A gas filter of the type having a flow-through housing with a plurality of removable gas filter elements disposed therein, each filter element comprised of a frame perimetrically connecting opposed flow-through sidewalls of texturized expansible-contractable sheet material, said filter elements containing activated granular carbon, the flow-through sidewalls exerting a positive compacting pressure on the contained granular carbon thereby preventing settling and channeling, and maintaining a gas flow-path of a minimum preselected length through the activated carbon.

2 Claims, 5 Drawing Figures

PATENTED DEC 10 1974                3,853,519
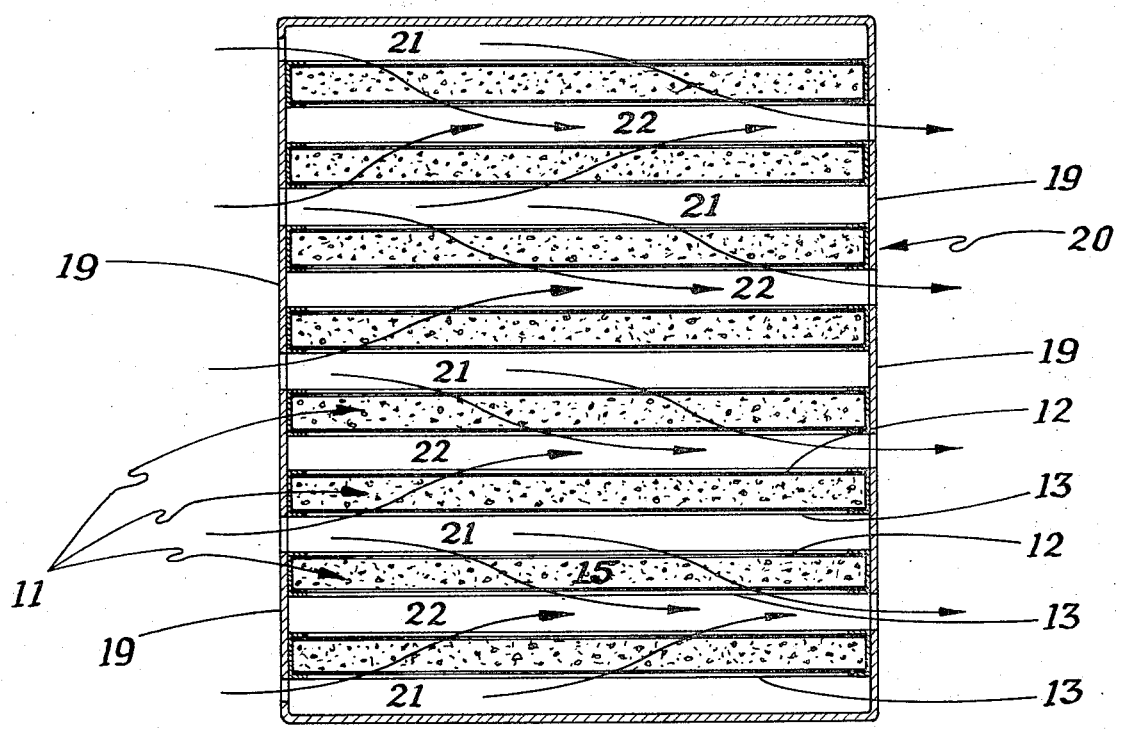
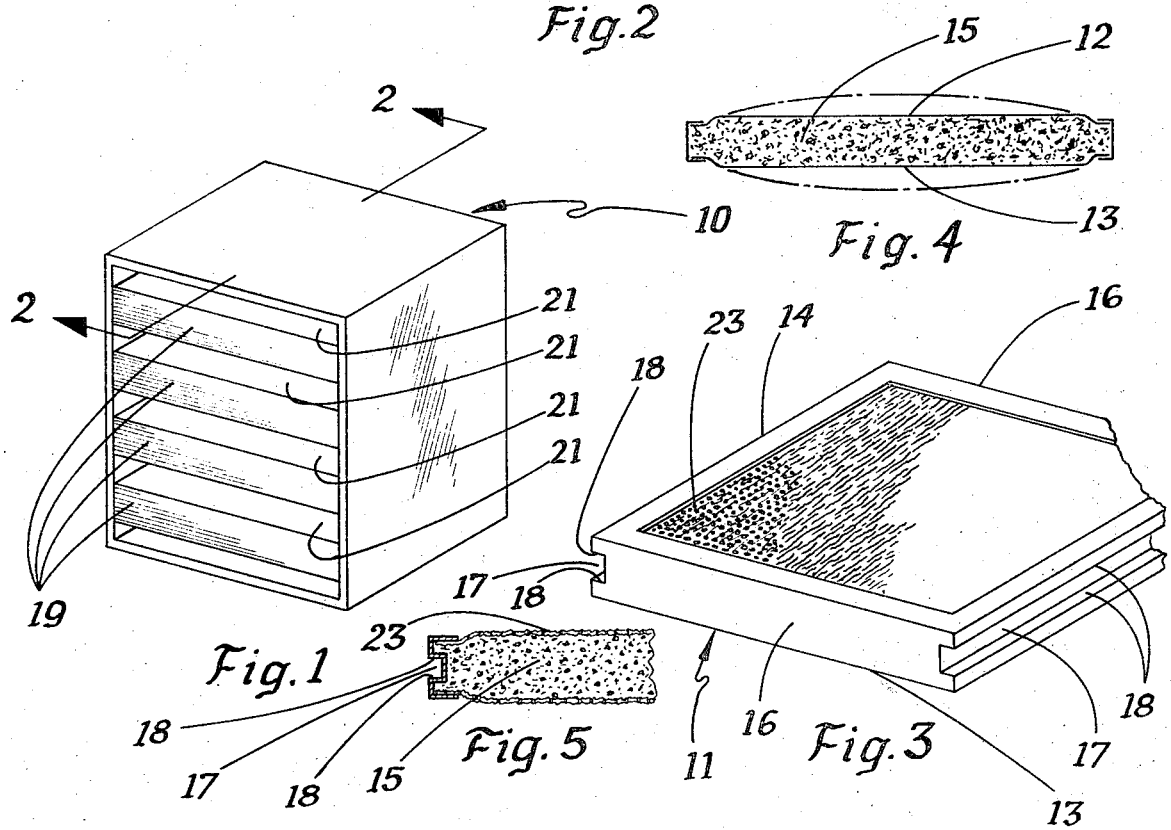

GAS FILTER

BACKGROUND OF THE INVENTION

One of the more prominent methods of filtering gas, especially for the removal of radioactive iodine, in containing nuclear contaminants for example, is to route the gas through a chamber containing a granular filter material such as activated carbon granules. The effectiveness of such a filtering method is dependent upon the velocity of the gas and the path length through the granular filter material. Since the passage of the gas through the filter material produces a pressure drop, with the amount of drop increasing as the path length increases, it is desirable to hold the path length to the minimum necessary to accomplish the desired filtering action. In addition, it is desirable to maintain the gas velocity through the granular material at a minimum so that the residence time or contact time within the material is sufficient to accomplish the desired filtering. Generally a relative low pressure drop and an adequate contact time are accomplished by utilizing a plurality of chambers of granular material or a plurality of paths through the granular material or both.

Typically, a plurality of paths is provided by stacks of drawer-like filter elements filled with granular material. These filter elements are generally horizontally aligned and equally spaced with respect to each other with the spaces therebetween alternately in flow communication with a gas inlet and a gas outlet. Thus, the gas to be treated enters the inlet spaces between the filter elements, passes through the filter elements containing granular charcoal, and passes out through the outlet spaces between the filter elements. However, this type of an arrangement has several problems. Firstly, the granular material contained in the filter elements has a tendency to settle and leave large voids or pockets through which the gas to be purified can freely pass without being filtered. To eliminate such settling and its consequent effects, prior art filter elements were typically over-filled until the flow-through sidewalls bulged outwardly. Such over-filling resulted in the modulus of elasticity of the flow-through sidewalls being exceeded, with the result that little or no compacting pressure was maintained on the filter bed, thus the carbon was free to settle as before. Two other disadvantages were that, filter elements of uneven thickness were created, with the result that, since the gases to be filtered had a tendency to travel along the path of least resistance, very little or no gas passed through the thicker portions of the filter elements. In addition, the granular filter material in the narrower portions of the filter elements became prematurely saturated with contaminant, leading to excessive carryover and early filter failure. Attempts at controlling the bulging, by the use of bolts through the midsections of the filter elements proved to be ineffective, since the gas to be filtered would leak through the filter elements around the bolts, thereby lowering the filter efficiency. The invention of this disclosure solves the prior art problems and provides a straightforward, inexpensive, readily constructed, and easily maintained gas filter which avoids filter bed settling and maintains a constant gas pathlength through the filter bed.

SUMMARY OF THE INVENTION

The present invention provides a gas filter having a housing containing a plurality of removable filter elements, each filter element having a peripheral flow-through frame and expansible-contractable flow-through sidewalls attached to opposed sides of the frame to define a granular active-charcoal receiving cavity.

More specifically, the invention provides: a gas filter comprising a flow-through housing having a dirty gas inlet and a clean gas outlet; a plurality of removable gas filter elements each including a peripheral frame and attached opposed flow-through faces, the faces being of texturized expansible-contractable sheet material to provide a planar surface with a cross-section of peaks and valleys having a bi-axially oriented coefficient of restitution at least in one dimension greater than the coefficient of restitution of untexturized sheet material; mounting means for disposing the gas filter elements within the housing in spaced relationship; granular carbon filter material contained in the removable gas filter elements and held under compression by the expansible-contractable texturized sheet material faces to prevent settling thereof and insure that all gas passing therethrough passes a minimum preselected distance through the filter material.

DESCRIPTION OF THE DRAWINGS

FIG. 1 is an isometric view of a filter apparatus according to the present invention.

FIG. 2 is an enlarged vertical sectional view taken in a plane passing through line 2—2 of FIG. 1.

FIG. 3 is an isometric view showing a removable carbon tray.

FIG. 4 is a schematic view showing the expansible-contractable tray faces containing activated carbon granules under compacting pressure.

FIG. 5 is a partial cross-sectional view of a removable carbon tray showing the peaks and valleys of the texturized tray faces.

DESCRIPTION OF THE PREFERRED EMBODIMENT

In the figures the numeral 10 generally designates a six-sided flow-through housing, having a dirty gas inlet and a clean gas outlet. Housing 10 contains a filter tray assembly 20 comprised of a plurality of removable gas filter elements 11. An enlarged view of a single gas filter element 11 is shown in FIG. 3. Each filter element 11 is a hollow six-sided box-like structure, containing activated carbon granules 15, which extends from adjacent the dirty gas inlet to adjacent the clean gas outlet of housing 10. The width of the gas filter element is equal to the width of housing 10 and the top face 12 and bottom face 13 are held in spaced parallel relationship a relatively short distance apart by the sides 14 and ends 16 so that the gas filter element 11 has a relatively shallow depth, as shown in FIG. 3. Each of the gas filter elements 11 is constructed in the same manner. A large thin panel of rigid sheet material, which is preferably a light metal or the like, is bent along its outermost periphery to provide a support-giving edge. The sheet material itself is first texturized to provide a planar surface having a cross-sectional pattern of peaks and valleys to give the sheet material a bi-axially oriented coefficient of restitution of the sheet material in its texturized condition the phrase "bi-axially oriented coefficient of restitution" relates to the property of material wherein the coefficient of restitution is oriented with respect to two separate axes wherein the "coefficient of restitution" is the ability of a normally flat sheet of material which has been deformed physically or texturized and upon stretching the material tends to return to its originally deformed state. For example, a paper commonly referred to as "crepe paper" exhibits the aforesaid properties. The texturized sheet material when used as top and bottom faces 12 and 13 respectively, is stronger than an equivalent thickness of untexturized sheet material. In addition, the greater coefficient of restitution of the texturized sheet material allows the granular carbon material to be tightly compacted into the filter element 11 without exceeding the elastic limits of the sheet material thus a uniform compacting pressure is maintained on the filter material. Also since the texturized sheet material is expansible-contractable, uniform expansion of the filter element faces is realized when it is filled with granular carbon particles. FIG. 4 shows the typical bowing observed in a filter element without texturized faces in dashed lines compared to the uniform expansion realized in a filter element with expansible-contractable texturized faces in solid lines.

Texturizing can be accomplished in a variety of ways, the most advantageous of which is to simply pass the sheet material through the nip of two intermeshing, mating rolls which impart a texturized surface to the flat sheet material as shown in FIG. 5. Alternatively, texturizing can be accomplished by passing the flat sheet material through the nip of a set of rolls rotating at a given speed and then through a second nip of a second set of rolls closely associated in line with the first, rotating at a slower speed than the first, thereby causing a linear compression within the flat sheet material at a point between the two sets of rolls. Such compression manifests itself in the form of a multiplicity of peaks and valleys similar to those which are provided by use of mating rolls. Other suitable means for providing a texturized flat sheet material can be devised, all of which would be satisfactory as long as the method of texturizing imparts to the flat sheet material a bi-axially oriented coefficient of restitution, which yields a coefficient of restitution that is greater in either direction than the coefficient of restitution of the flat sheet material in that direction in its untexturized condition. It should be noted that it is not necessary for the texturizing step to impart the same magnitude of restitution in both the lateral and longitudinal directions across the flat sheet material. But the coefficient of restitution in a given direction should be greater than the coefficient of restitution of the untexturized flat sheet in the same direction.

The texturized flat sheet is then further prepared for use in the filter assembly of this invention by providing therein a plurality of regularly spaced holes 23 extending over substantially the entire surface area of the texturized sheet, except that no holes are located within a preselected distance from the edge, which, for example, may be approximately equal to one-half of the minimum desirable path length through the charcoal granules through which the gas passes. It is to be understood that this preselected distance is not essential to the operation of the filter assembly but is advantageously provided to prevent the passage of only partially filtered gas through the filter element.

The sides and ends of the filter elements 14 and 16 respectively, are constructed from solid pieces of rigid material. Sides 14 have provided therein a holding means, in this case parallel grooves 17, which are adapted to be received by corresponding projections or tongues (not shown) attached inside the housing sidewalls so that removable gas filter elements 16 are supported therein. Such projections or tongues are spaced evenly apart and are generally U-shaped in configuration with the base portion of the U projecting outwardly from the sidewalls so that the grooves 17 in sides 14 of the gas filter elements 16 may be slidably engaged therewith. Advantageously, the grooves may be provided with flexible resilient seal means 18 located on the upper and lower legs to sealingly engage the projections inside the housing.

A plurality of gas filter elements are then inserted into housing 10 and their alternate ends are vertically connected by flat sections 19 of gas impervious sheet material as shown in FIGS. 1 and 2. The junctions of these ends are sealed to make them leakproof and define sealed gas flow chambers 21 and 22 above and below the gas filter elements. It is clear from the Figures that about half of the so defined gas flow chambers, 21, are inlet chambers and open toward the dirty gas inlet and the other half of the gas flow chambers, 22, are outlet chambers and open toward the clean gas outlet. Such an arrangement insures that incoming dirty gas must pass through a gas filter element before leaving the housing. Since the texturized faces of the filter elements expand to a uniform thickness under the pressure of the compacted carbon granules, the filter elements are not bulged. Thus, the elements can be positioned closer together than the prior art assemblies with no danger of a reduction of the flow-through area of the gas flow chambers 21 and 22. Also the gas flow chambers can be made shallower because no allowance for bowing or bulging need be made. Such features result in a reduction in the overall size of the filter unit without any sacrifice in efficiency.

To fill a gas filter element with charcoal granules, the top face 12 is removed and charcoal granules are poured into the filter element until they are slightly above level with the top surface thereof. The top face is then replaced providing a constant uniform pressure on the charcoal granules by virtue of the bi-axially oriented coefficient of restitution of the top and bottom faces respectively. The constant uniform pressure exerted by the texturized filter element faces prevents settling; therefore, the filter elements can be used or shipped in any position. It should be further noted that the texturized top and bottom faces 12 and 13, respectively, eliminate the need for any compressible layer or padding or the like which is commonly found within prior art gas filter elements to maintain a constant pressure on the carbon granules. In addition, the texturized top and bottom faces provide a constant pressure on the charcoal granules and prevent relative movement thereof and therefore prevent attrition or wearing between granules with consequent settling of the carbon bed.

Thus, a unit filter assembly has been described in which there is provided gas filter elements having texturized sheet material top and bottom faces which function to prevent voids in a granular carbon bed and to eliminate bulging of such a bed as well as allow economy in construction of such filter assembly since thinner material may be used for the top and bottom faces,

Having thus described the invention what is claimed is:

1. A gas filter comprising: a flow-through housing having a dirty gas inlet and a clean gas outlet; a plurality of removable gas filter elements each including a peripheral frame and two attached opposed flow-through faces, at least one of said faces being detachably mounted to said frame, said faces having planar surfaces of texturized expansible-contractable sheet material in a cross-section of peaks and valleys with a bi-axially oriented coefficient of restitution whereby the coefficient of restitution in either direction is greater than the coefficient of restitution for untexturized sheet material; mounting means for disposing said gas filter elements within said housing in spaced relationship; granular carbon filter material contained in said removable gas filter elements and held under compression by said expansible-contractable texturized sheet material faces to prevent settling thereof and insure that all gas passing therethrough passes a minimum preselected distance through said filter material whereby said gas filter elements eliminate the need for additional support means in order to maintain a constant pressure on said carbon filter material.

2. The gas filter of claim 1 wherein the said flow-through faces are of flat sheet steel, linearly compressed in the longitudinal direction to form peaks and valleys therein, giving said sheet steel a bi-axially oriented coefficient of restitution.

* * * * *